(12) United States Patent
Barber

(10) Patent No.: US 11,087,613 B2
(45) Date of Patent: Aug. 10, 2021

(54) SYSTEM AND METHOD OF COMMUNICATING AN EMERGENCY EVENT

(71) Applicant: Stephanie Barber, Jeffersonville, IN (US)

(72) Inventor: Stephanie Barber, Jeffersonville, IN (US)

(*) Notice: Subject to any disclaimer, the term of this patent is extended or adjusted under 35 U.S.C. 154(b) by 71 days.

(21) Appl. No.: 16/565,478

(22) Filed: Sep. 9, 2019

(65) Prior Publication Data

US 2020/0082706 A1 Mar. 12, 2020

Related U.S. Application Data

(60) Provisional application No. 62/728,614, filed on Sep. 7, 2018.

(51) Int. Cl.
| | |
|---|---|
| G08B 25/00 | (2006.01) |
| G08B 25/01 | (2006.01) |
| H04W 4/02 | (2018.01) |
| H04W 4/90 | (2018.01) |
| H04W 4/80 | (2018.01) |
| H04W 76/50 | (2018.01) |

(52) U.S. Cl.
CPC ......... *G08B 25/009* (2013.01); *G08B 25/016* (2013.01); *H04W 4/027* (2013.01); *H04W 4/80* (2018.02); *H04W 4/90* (2018.02); *H04W 76/50* (2018.02)

(58) Field of Classification Search
CPC .... G08B 25/009; G08B 25/016; G08B 25/08; G08B 5/36; H04W 4/02; H04W 4/021; H04W 4/027; H04W 4/029; H04W 4/06; H04W 4/22; H04W 4/80; H04W 4/90; H04W 76/50
See application file for complete search history.

(56) References Cited

U.S. PATENT DOCUMENTS

| | | | | |
|---|---|---|---|---|
| 10,325,471 | B1 * | 6/2019 | Victor | .................... G16H 50/20 |
| 2010/0197351 | A1 * | 8/2010 | Ewell, Jr. | ................ H04M 1/66 |
| | | | | 455/565 |
| 2011/0117878 | A1 * | 5/2011 | Barash | .................... H04W 4/90 |
| | | | | 455/404.2 |

(Continued)

*Primary Examiner* — Orlando Bousono

(57) ABSTRACT

A system and method for communicating an emergency event allows users to communicate with personal contacts and appropriate authorities during an emergency situation. A user may equip a wearable device to enhance location tracking and wireless communication mechanisms. At least one primary mobile device is communicably coupled to at least one secondary mobile device, and a plurality of emergency procedures is stored on the secondary mobile device. The at least one primary mobile device and the at least one secondary mobile device may further store a series of stored settings and general information, including contacts, medical histories, demographic information, and more. The plurality of emergency procedures denotes communication preferences with other devices. Stored data may be further enhanced through the inclusion of a suite of biometric, motion-detecting, electrical, and other electronic sensors that improve communication between parties in danger or at risk and personal contacts or emergency authorities.

12 Claims, 15 Drawing Sheets

(56) References Cited

U.S. PATENT DOCUMENTS

| | | | | |
|---|---|---|---|---|
| 2014/0364081 | A1* | 12/2014 | Rauner | G08B 25/016 |
| | | | | 455/404.2 |
| 2015/0358794 | A1* | 12/2015 | Nokhoudian | H04W 4/90 |
| | | | | 455/404.1 |
| 2016/0192166 | A1* | 6/2016 | deCharms | H04L 65/1096 |
| | | | | 348/14.02 |
| 2016/0284038 | A1* | 9/2016 | Johnson | G06Q 50/265 |
| 2017/0099579 | A1* | 4/2017 | Ryan | H04M 3/5116 |
| 2017/0325091 | A1* | 11/2017 | Freeman | A61B 5/0077 |
| 2019/0088101 | A1* | 3/2019 | Tunnell | G16H 20/10 |

* cited by examiner

SYSTEM AND METHOD OF COMMUNICATING AN EMERGENCY EVENT

The current application claims a priority to the U.S. design application Ser. No. 29/686,830 filed on Apr. 8, 2019 and the U.S. Provisional Patent application Ser. No. 62/728,614 filed on Sep. 7, 2018. The current application is filed on Sep. 9, 2019 while Sep. 7, 2019 was on a weekend.

FIELD OF THE INVENTION

The present invention relates generally to an application in which a series of interconnected devices may establish the location of a target device. This application is understood to be activated in case of emergencies, intended to provide navigational guidance to the location of a user in distress.

BACKGROUND OF THE INVENTION

In present times, individuals are known to employ various emergency broadcast systems capable of reporting the position of a user in distress across large distances by connecting to a local cellular network, satellite transmissions, or by direct line-of-sight radio communication. These means are understood to be employed by users expecting to face hazardous scenarios that may result in said users becoming lost, injured, or otherwise requiring outside aid. These devices are intended to allow any potential rescuers to locate a user in distress by guiding the emergency responders to the user's location utilizing various systems known in the industry, such as the global positioning system (GPS), radio signal triangulation, cluster analysis based on near-field communications (NFC), direct satellite signals, and various other means of summoning aid to any location, no matter how remote. These emergency locator functions are additionally known to be integrated into cellular devices, either as a native feature or an application that utilizes existing hardware to perform the necessary functions of a locator beacon. However, the existing systems generally do not broadcast the location of a user to multiple entities directly, instead producing a general signal detectable only by compatible devices prepared to receive telemetry data from a broadcast source. The existing devices, particularly the cellular devices adapted to serve as emergency devices, require significant infrastructure (e.g. cell towers, local wireless internet access, a nearby cluster of similar devices in communication, etc.) to properly transmit a signal across any significant distance.

The present invention aims to enable a user to transmit a signal to multiple users in the event of an emergency. This signal will be carried across a variety existing data infrastructure, including, but not limited to, wireless personal area networks (WPANs, via Bluetooth and other NFC standards), wireless local area networks (WLANs, generally recognized under the name "Wi-Fi"), wireless ad hoc networks (radio nodes organized in a mesh topology), cellular networks (operating under the Global System for Mobile Communication standards (GSM) and others), and the global area network (GAN, supported across smaller local networks and satellite coverage areas). The present invention additionally supports a function in which users may relay data across a point-to-point system by connecting two or more devices together utilizing a pairing system integral to the present invention. The present invention additionally controls the operation of local components on the user-operated devices, including a series of visible and audible warning signals intended to alert nearby individuals of a user in distress. These signals may be utilized by search-and-rescue parties to locate a non-visible user in close proximity and may discourage aggressive parties from continuing to harass the user. Various embodiments of the present invention may additionally feature a voice recognition function, both to allow hands-free operation of the present invention and to reduce the need for alternate forms of (slower) data input. Though various iterations of the present invention may be operated via any suitable device, the ideal application would constitute a watch-style device, equipped with any and all transceivers, processors, and data storage media necessary to facilitate full operation of the present invention. The ideal device will additionally be sealed against heat, cold, water, shock, and include a self-contained power supply capable of extended operation without replenishment. Operating as intended, the present invention will, ideally provide a measure of security to a user by providing a constant lifeline to outside assistance regardless of distance, environment, or existing infrastructure.

DETAILED DESCRIPTION OF THE INVENTION

All illustrations of the drawings are for the purpose of describing selected versions of the present invention and are not intended to limit the scope of the present invention.

Figure 1:
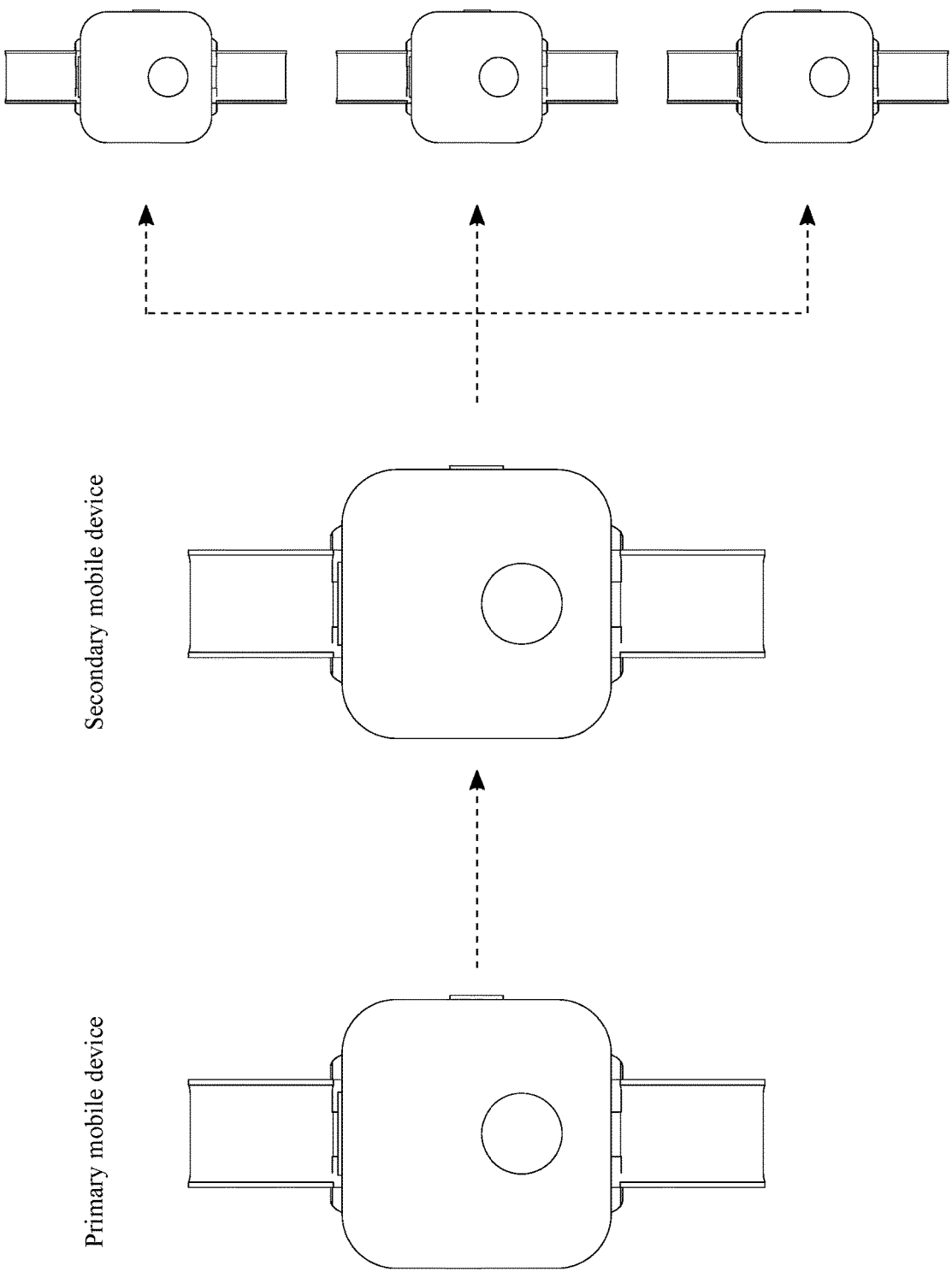
FIG. 1 is a schematic diagram representing an overview of the system of the present invention.
Figure 2:
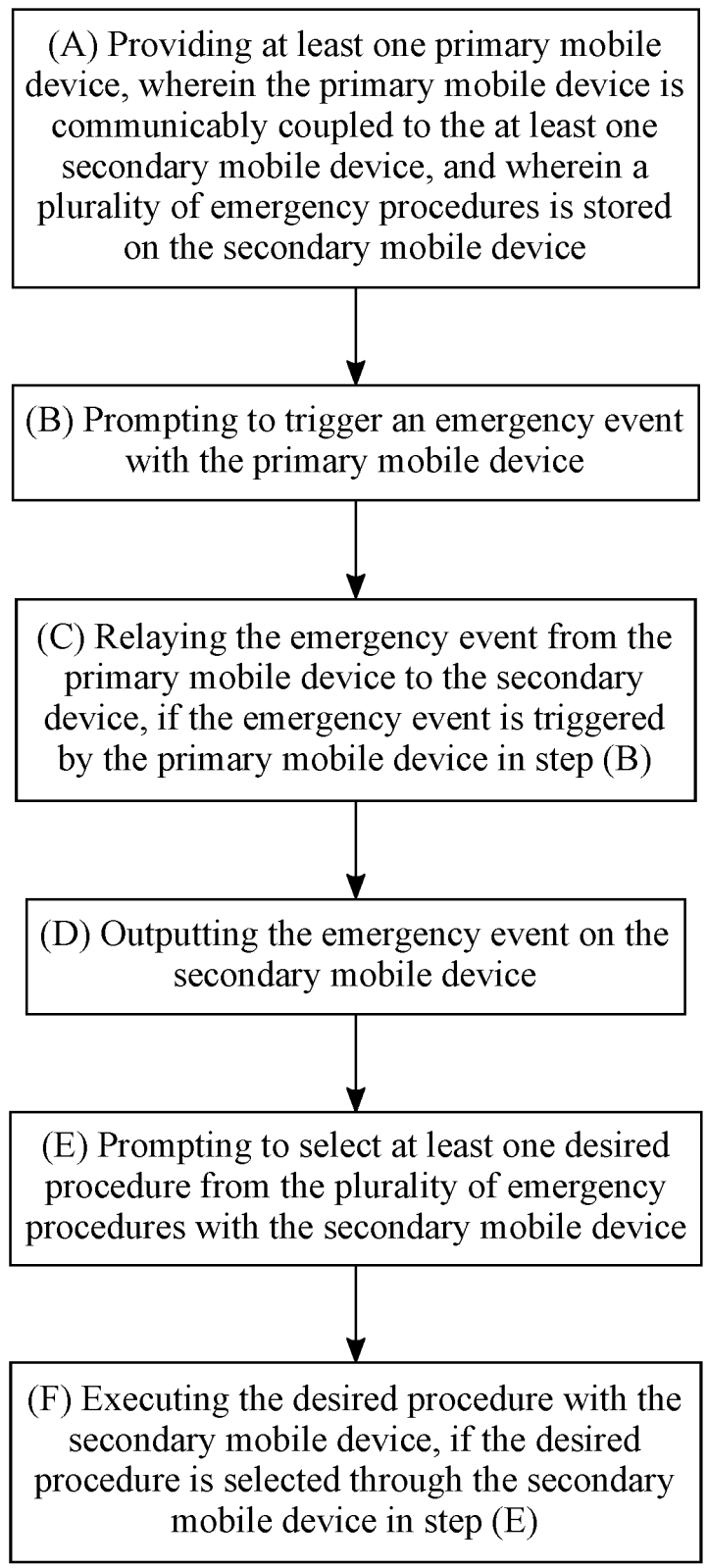
FIG. 2 is a flowchart illustrating the overall process for the method of the present invention.

The present invention is a method for communicating an emergency event that allows the user to communicate with personal contacts and appropriate authorities during an emergency situation, as represented in FIG. 1. A user has the ability to equip a wearable device to facilitate and enhance location tracking and wireless communication mechanisms. The system of the present invention includes at least one primary mobile device, wherein the primary mobile device is communicably coupled to at least one secondary mobile device, and wherein a plurality of emergency procedures is stored on the secondary mobile device (Step A), as represented in FIG. 2. The at least one primary mobile device and the at least one secondary mobile device preferably relate to any of a variety of specialized or properly equipped smartwatches or wearable devices; however, in alternative embodiments, the at least one primary mobile device and the at least one secondary mobile device may also relate to any of a variety of handheld devices, including iPhones, Androids, or other smartphones. The at least one primary mobile device and the at least one secondary mobile device may further store a series of stored settings and general information, including contacts, medical histories, demographic information, and more. Furthermore, the at least one primary mobile device and the at least one secondary mobile device include any and all necessary electronic components, including controllers, portable or non-portable electronic power supplies, resisters, wires, and other such common electronic components necessary for the operation of the present invention. The plurality of emergency procedures denotes various communication preferences with other devices. Stored data may be further enhanced through the inclusion of a suite of biometric, motion-detecting, electrical, and other electronic sensors that improve communication between parties in danger or at risk and personal contacts or emergency authorities.

The overall process for the method of the present invention allows appropriate parties with information necessary to communicate effectively between various parties. An emergency event is prompted to be triggered with the primary mobile device (Step B), as represented in FIG. 2. An emergency event is an indication of an event in which the wearer of the primary mobile device feels unsafe or is in immediate danger. Such prompting may provide the user with an ability to respond through the appearance of a visual indicator, or with the usage of a manually operated switch or button. The emergency event is relayed from the primary mobile device to the secondary mobile device, if the emergency event is triggered by the primary mobile device (Step C). Predetermined relevant information is therefore sent between the primary mobile device and the secondary mobile device. The emergency event is outputted on the secondary mobile device (Step D). In this way, the emergency event visually and/or audibly notifies a user of the secondary mobile device. Next, at least one desired procedure from the plurality of emergency procedures is prompted to be selected with the secondary mobile device (Step E). Thus, the secondary mobile device may determine appropriate action to take following receipt and output of information from the emergency event. Finally, the desired procedure is executed with the secondary mobile device, if the desired procedure is selected through the secondary mobile device in Step E (Step F). In this way, the secondary mobile device preferably contacts appropriate authorities or other secondary mobile devices for assistance. Furthermore, the secondary mobile device may respond by assuming control over the primary mobile device.

The primary mobile device and the at least one secondary mobile device are preferably equipped to be worn by a user, thus enabling the primary mobile device and the at least one secondary mobile device to enable usage of a variety of biometric sensors and feedback stimuli, such as notification vibrations and the like. To this end, the primary mobile device is provided with a wearable strap. Similarly, the secondary mobile device is provided with a wearable strap. This arrangement enables users to equip the primary mobile device and the at least one secondary mobile device in convenient position for use.

Figure 3:
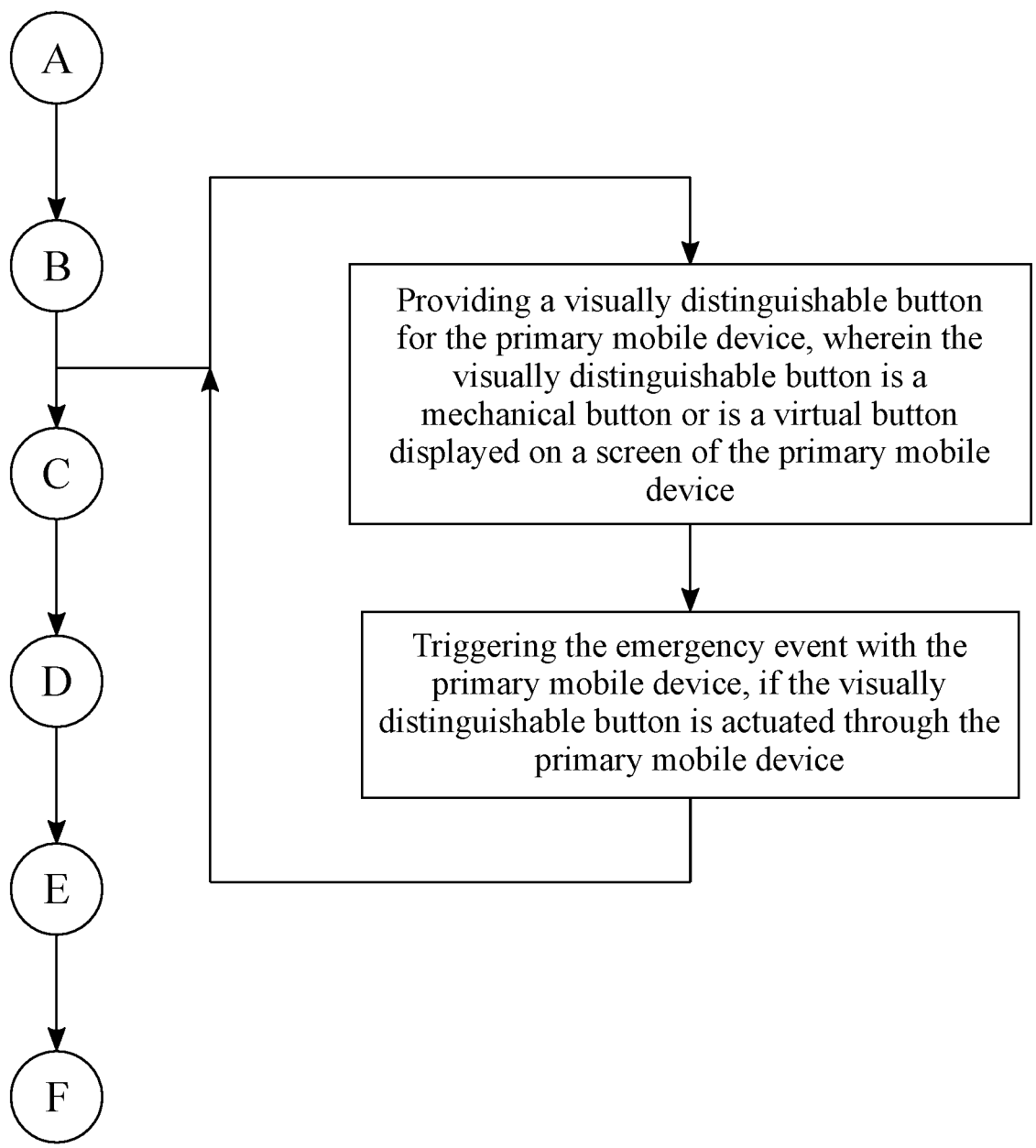
FIG. 3 is a flowchart illustrating the subprocess of triggering an emergency event with a button.

In order to interact with the primary mobile device and the at least one secondary mobile device, utilization of the present invention is facilitated through the employment of a physical button, lever, switch, dial, other simple tool, or an interactive visual representation of these mechanisms. To achieve this, a visually distinguishable button for the primary mobile device is provided during Step B, wherein the visually distinguishable button is a mechanical button or is a virtual button displayed on a screen of the primary mobile device, as represented in FIG. 3. Such a mechanism improves the ability of the user to interact with the primary mobile device and the at least one secondary mobile device. The emergency event is triggered with the primary mobile device, if the visually distinguishable button is actuated through the primary mobile device. Thus, the user of the primary mobile device controls when to send an emergency signal to the second mobile device.

Figure 4:
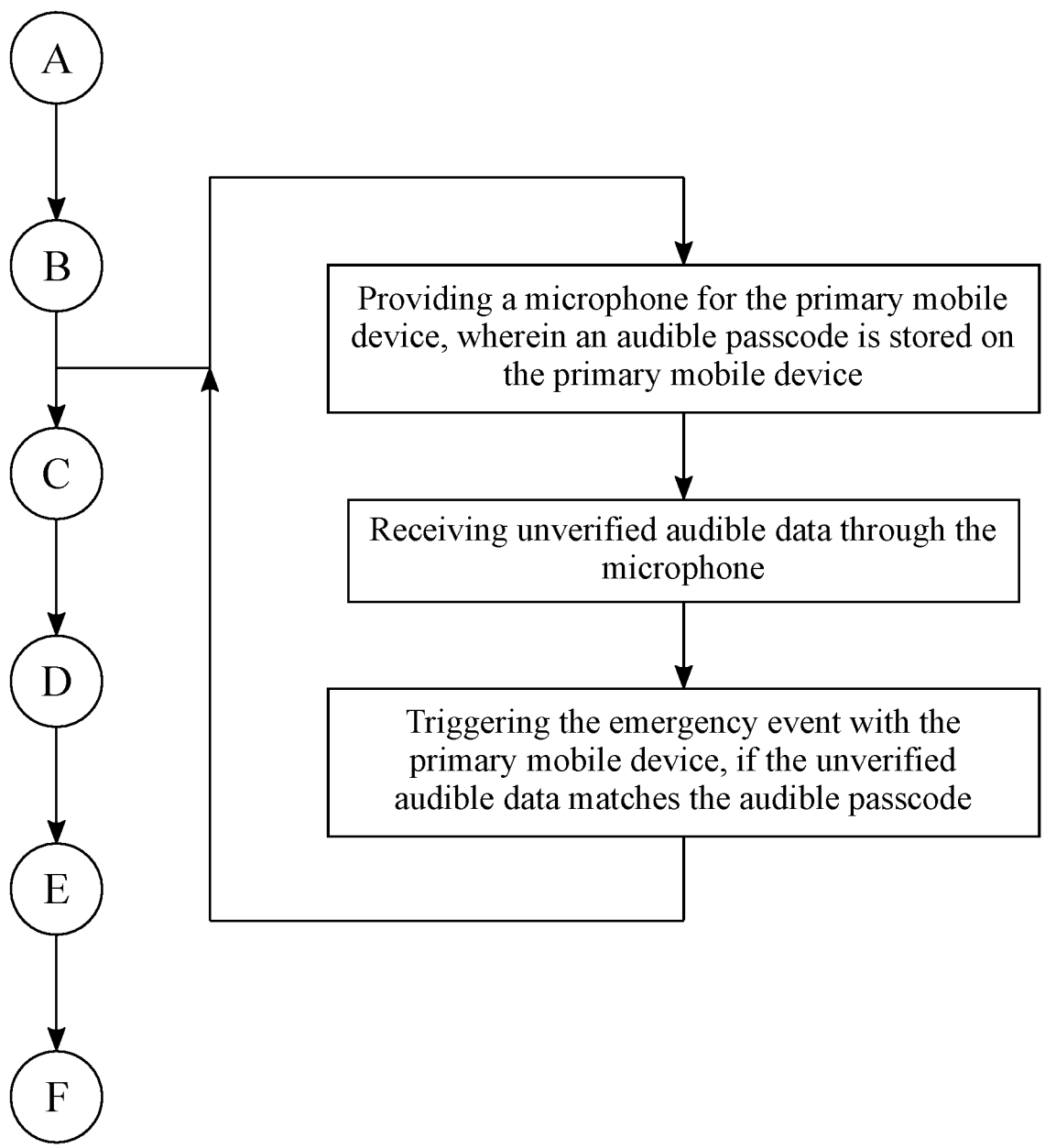
FIG. 4 is a flowchart illustrating the subprocess of triggering an emergency event with a vocal passcode.

In another embodiment of the present invention, the user may be unwilling or unable to interact with the primary mobile device or the at least one secondary mobile device through physical means. To this end, a microphone for the primary mobile device is provided, wherein an audible passcode is stored on the primary mobile device, as represented in FIG. 4. The microphone is an audio input device capable of capturing audio data for use by the primary mobile device. The audible passcode is a particular audio dataset enabling reaction to a particular spoken word, phrase, expression, or other such unique key. Unverified audible data is received through the microphone. The unverified audio data is the raw translated input data that is vocally expressed from the user. The emergency event with the primary mobile device is triggered during Step B, if the unverified audible data matches the audible passcode. Thus, once confirmed within the primary mobile device, voice activation is a possible mechanism by which the primary mobile device may activate. Further, different voice commands may result in the triggering of different data for the emergency event being sent to appropriate parties.

Figure 5:
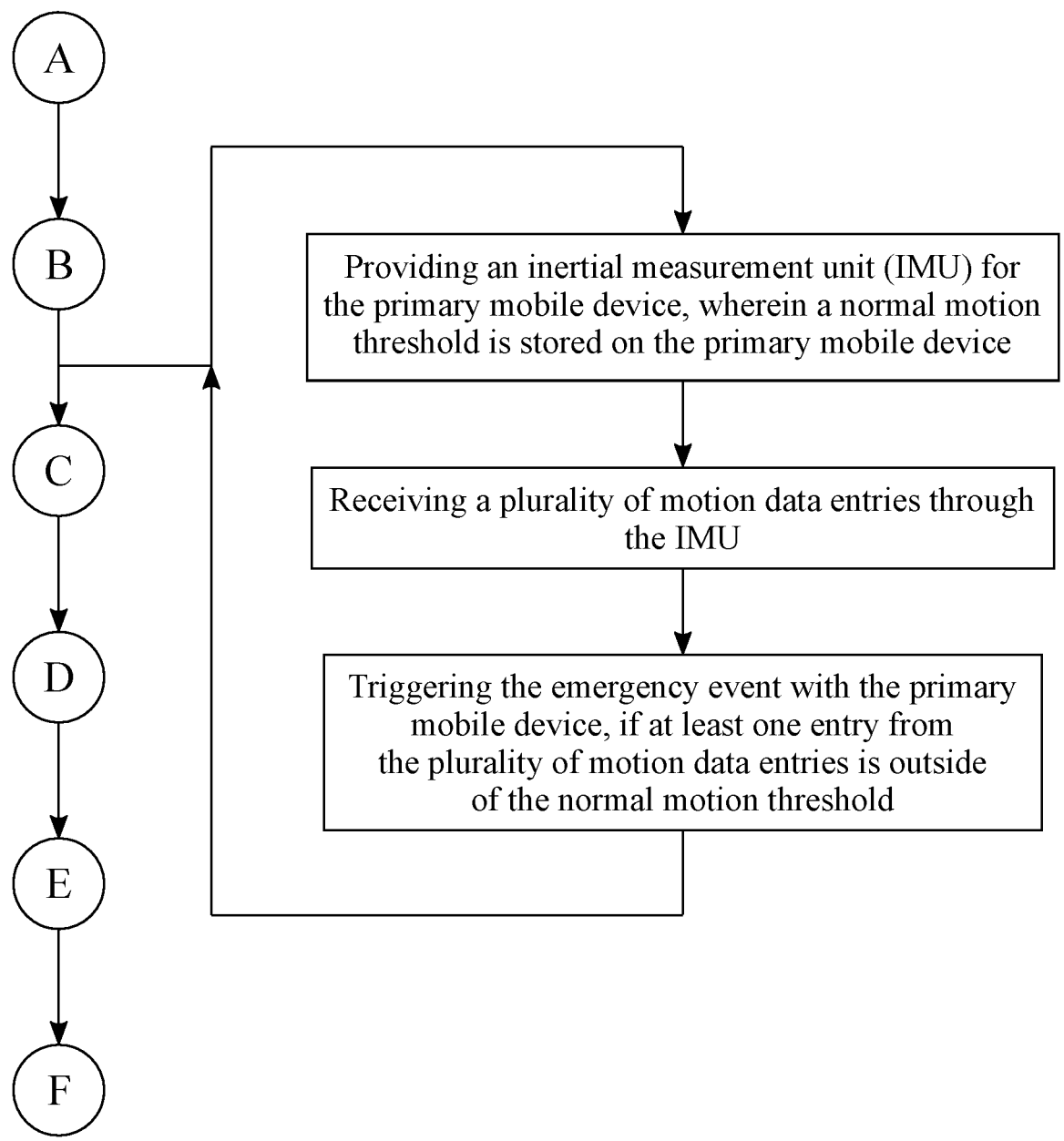
FIG. 5 is a flowchart illustrating the subprocess of triggering an emergency event with an excessive amount of force.

In a further embodiment of the present invention, the user of the primary mobile device may be unable to interact with the primary mobile device normally due to an extreme incident. In this case, the present invention must be equipped to handle sending an emergency event automatically due to extreme motion. To achieve this, an inertial measurement unit (IMU) is provided for the primary mobile device, wherein a normal motion threshold is stored on the primary mobile device, as represented in FIG. 5. The IMU is any of a variety of accelerometers or similar sensors capable of determining excessive motion of the primary mobile device. The normal motion threshold is a predetermined value associated with the IMU that indicates an alarming data value amongst a set of values registered by the IMU. A plurality of motion data entries is received through the IMU. The plurality of motion data relates to the dataset representing the motion of the primary mobile device. This dataset can fall within or outside of an acceptable range defined by the normal motion threshold. The emergency event is triggered with the primary mobile device during Step B, if at least one entry from the plurality of motion data entries is outside of the normal motion threshold. In this way, the primary mobile device is equipped to respond to an instance of extreme unmediated motion by the user. This arrangement is particularly advantageous in an emergency in which a user becomes incapacitated.

Figure 6:
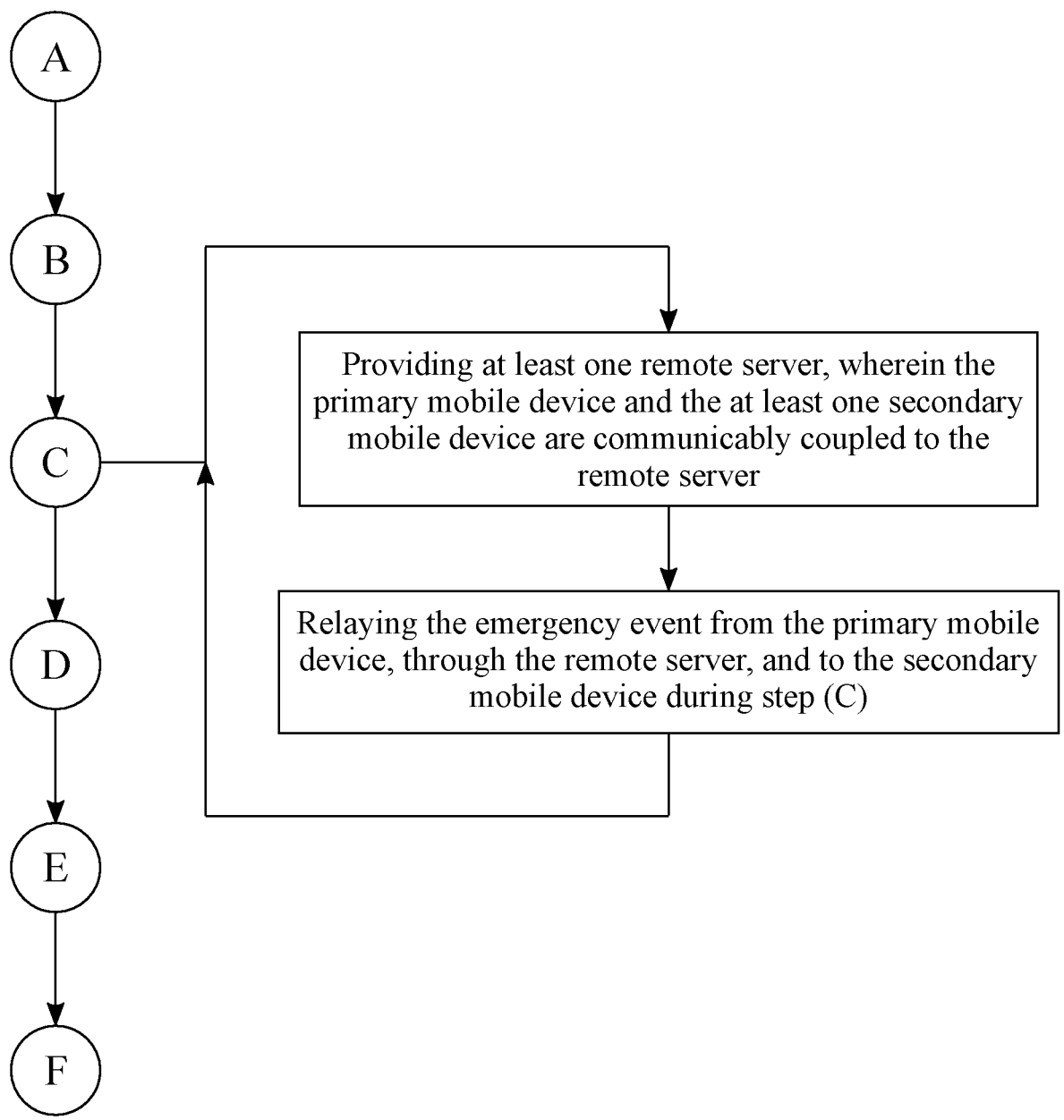
FIG. 6 is a flowchart illustrating the subprocess of sending an emergency event through a remote server.

The primary mobile device and the at least one secondary mobile device must be electronically connected in order to transmit information. To achieve this, at least one remote server is provided, wherein the primary mobile device and the at least one secondary mobile device are communicably coupled to the remote server, as represented in FIG. 6. The at least one remote server relates to a series of wirelessly interconnected routing devices, databases, and other such technologies responsible for the capture and transferal of information necessary for sending data between the primary mobile device and the secondary mobile device. The emergency event is relayed from the primary mobile device, through the remote server, and to the secondary mobile device during Step C. Therefore, the primary mobile device and the at least one secondary mobile device are connected wirelessly over long distances.

Figure 7:
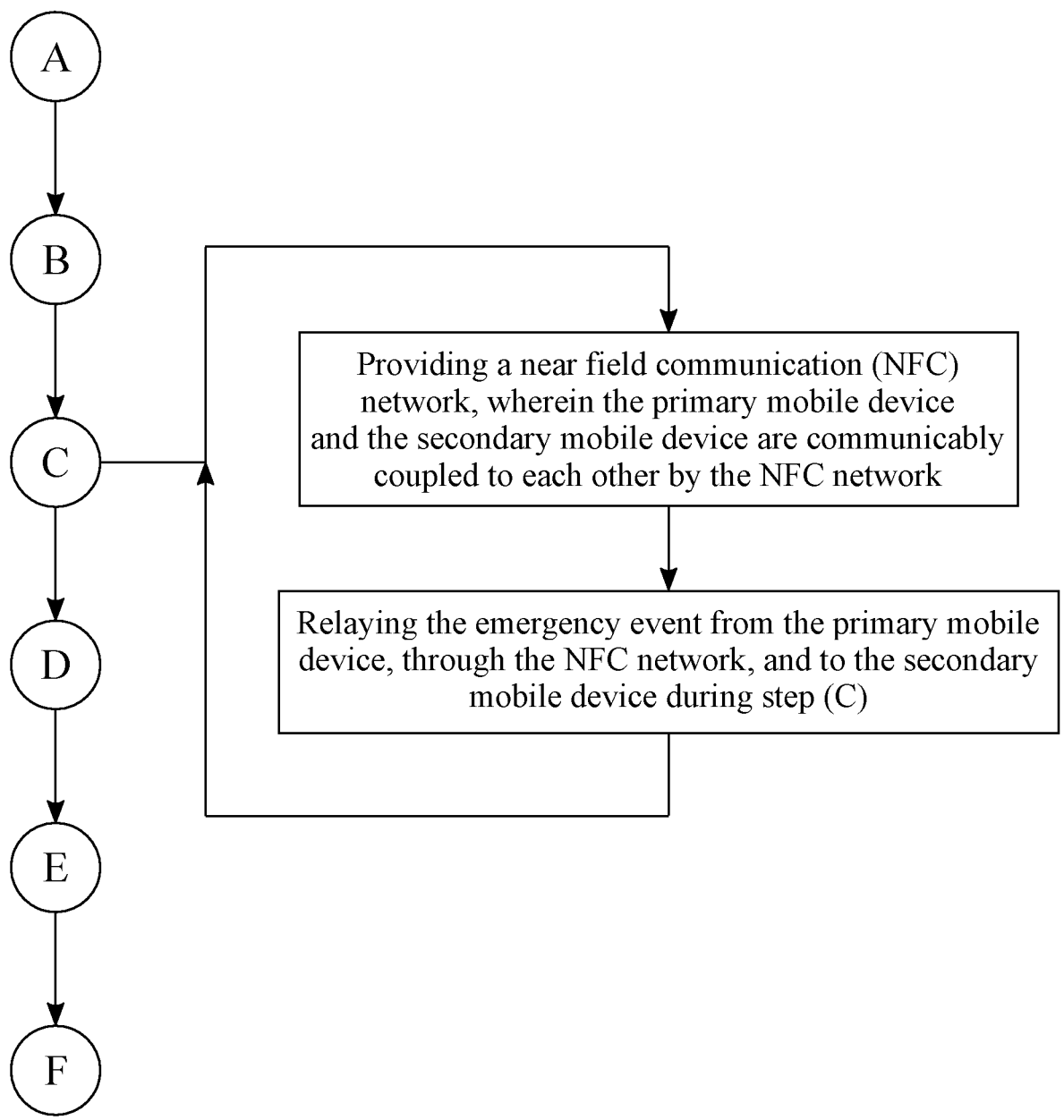
FIG. 7 is a flowchart illustrating the subprocess of sending an emergency event through a near field communication (NFC) network.

In many instances, it is advantageous to connect a primary mobile device to a previously unknown secondary mobile device. To this end, a near field communication (NFC) network is provided, wherein the primary mobile device and the secondary mobile device are communicably coupled to each other by the NFC network, as represented in FIG. 7. The NFC network relates to various mechanisms for wirelessly connecting devices over short distances. The emergency event is relayed from the primary mobile device, through the NFC network, and to the secondary mobile device during Step C. This arrangement enables enhanced connection of the primary mobile device to at least one secondary mobile device.

Figure 8:
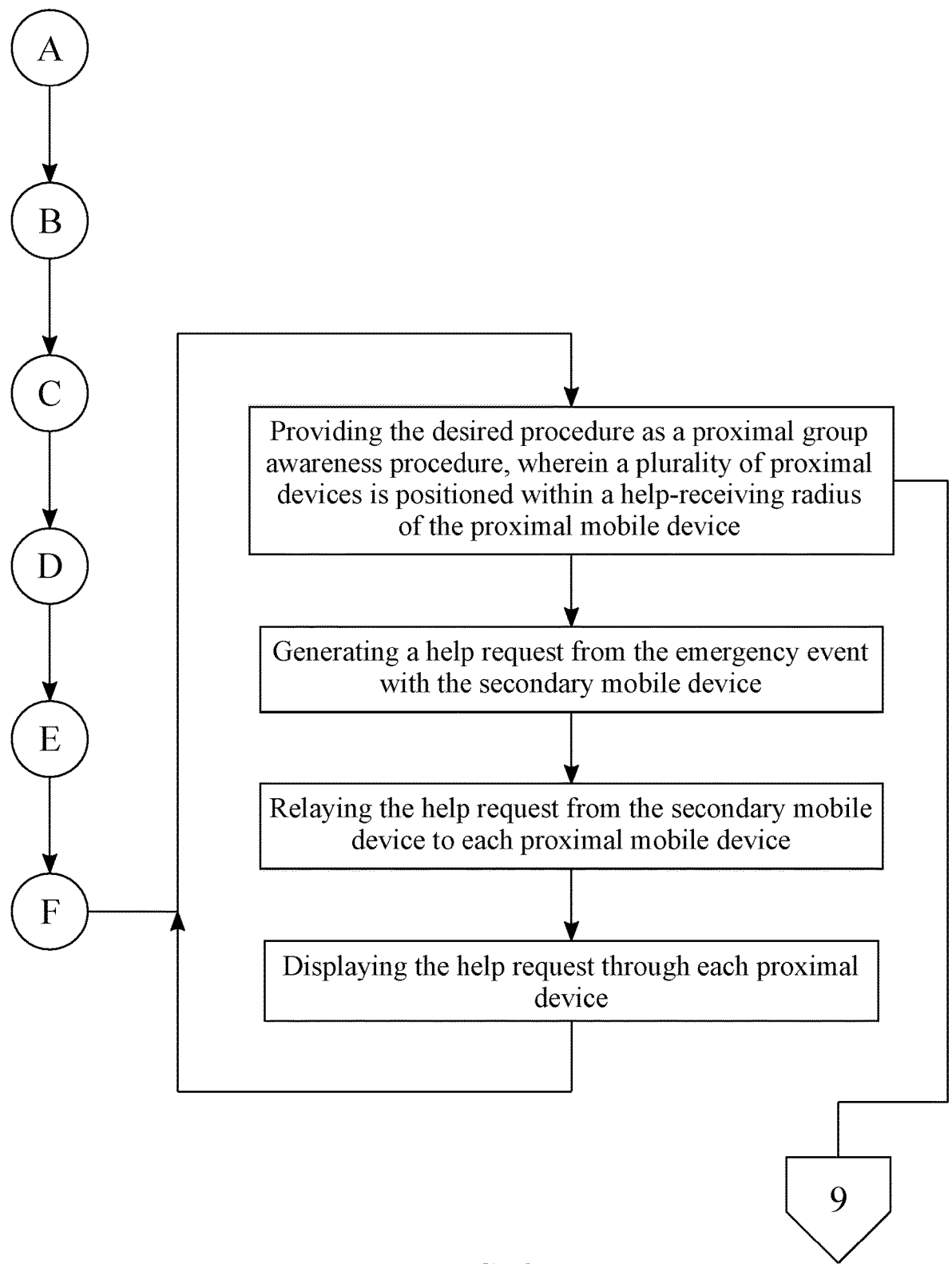
FIG. 8 is a flowchart illustrating the subprocess of generating a help request.

In several types of emergency, the operator of the secondary mobile device desires connection with a variety of different parties, especially first responders and people within a specific range of a primary mobile device which sent an emergency event. Therefore, the desired procedure is provided as a proximal group awareness procedure, wherein a plurality of proximal mobile devices is positioned within a help-receiving radius of the proximal mobile device, as represented in FIG. 8. The plurality of proximal mobile devices is a set of secondary mobile devices that are found to be near to an incident reported by a primary mobile device. The help-receiving radius is a predetermined distance from a primary mobile device. Such a situation is advantageous in various medical or hostile events. A help request is generated from the emergency event with the secondary mobile device. The help request is a broad signal sent to a variety of users of the proximal mobile device. The help request is relayed from the secondary mobile device to each proximal mobile device. This arrangement provides each of the proximal mobile devices with the information necessary for users of the proximal mobile devices to be knowledgeable about a given emergency situation. Finally, the help request is displayed through each proximal mobile device. Thus, the users of the proximal mobile device are equipped to intervene or assist in the protection of the user of the primary mobile device which sent the emergency event.

Figure 9:
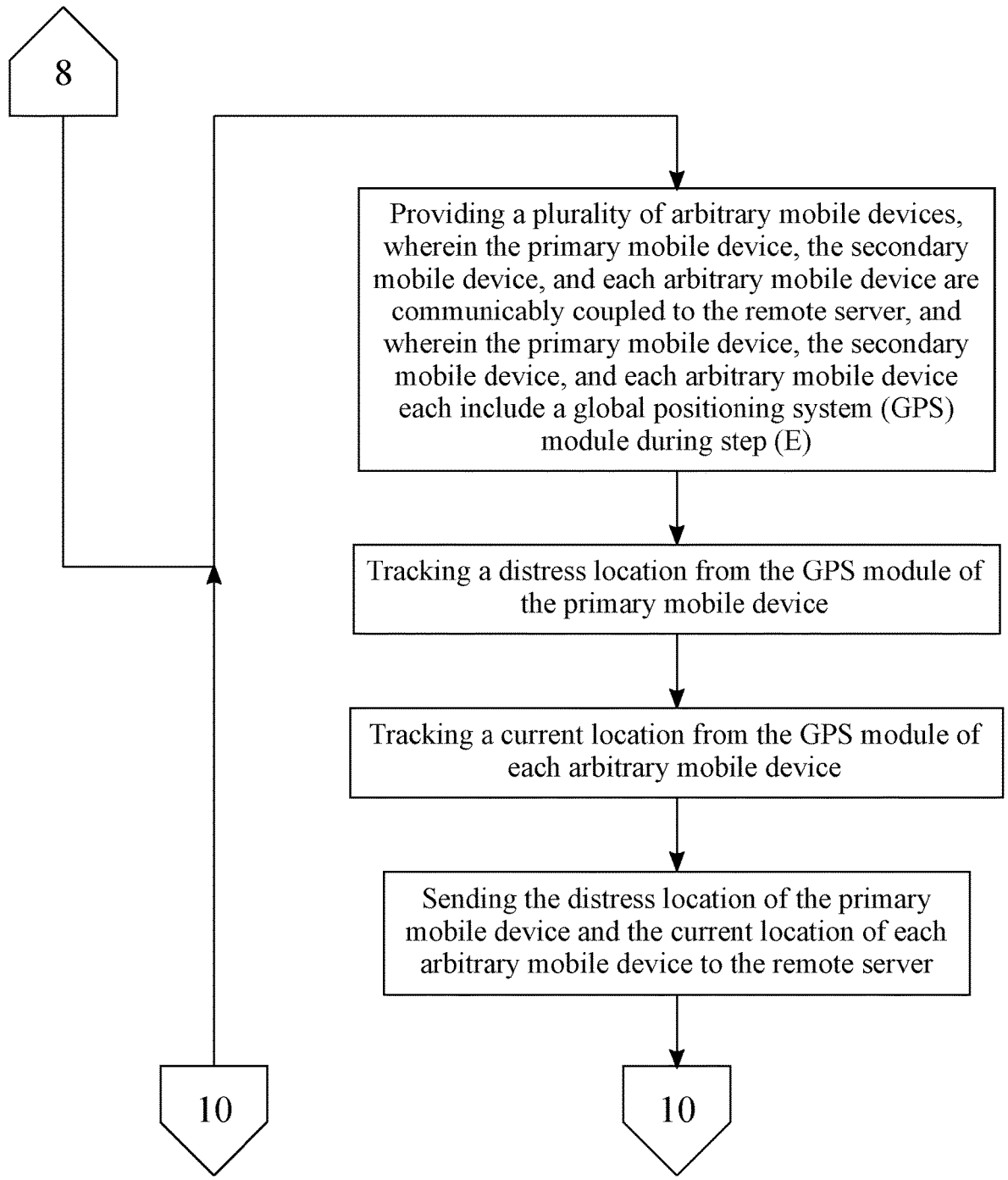
FIG. 9 is a flowchart illustrating the subprocess of identifying a proximal device.
Figure 10:
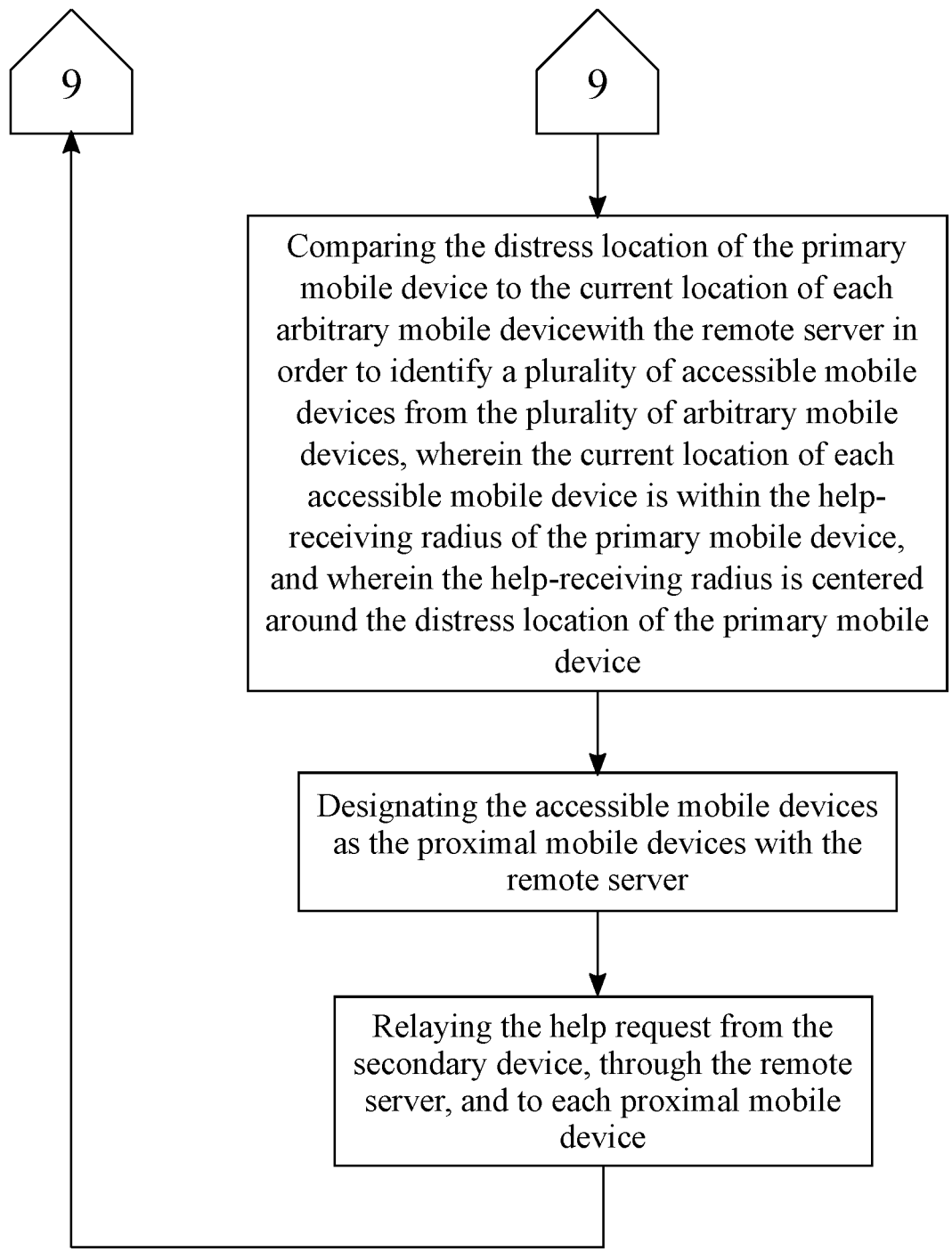
FIG. 10 is a continuation of FIG. 9.

In an exemplary embodiment, the user of the secondary mobile device may desire to receive support from people near to an incident. To this end, a plurality of arbitrary mobile devices is provided, wherein the primary mobile device, the secondary mobile device, and each arbitrary mobile device are communicably coupled to the remote server, and wherein the primary mobile device, the secondary mobile device, and each arbitrary mobile device each include a global positioning system (GPS) module, as represented in FIGS. 9 and 10. The plurality of arbitrary mobile devices is a set of electronic devices capable of receiving the emergency event. Providing location data effectively results in the generation of an interactive map of nearby users and emergency services. A distress location is tracked from the GPS module of the primary mobile device. The primary mobile device therefore stores data regarding the coordinates of its user. Similarly, a current location is tracked from the GPS module of each arbitrary mobile device. Each arbitrary mobile device therefore stores information necessary for locating the respective users of each of the arbitrary mobile devices. The distress location of the primary mobile device and the current location of each arbitrary mobile device is sent to the remote server. Therefore, the remote server contains data regarding all users, thus enabling comparison. The distress location of the primary mobile device is compared to the current location of each arbitrary mobile device with the remote server in order to identify a plurality of accessible mobile devices from the plurality of arbitrary mobile devices, wherein the current location of each accessible mobile devices is within the help-receiving radius of the primary mobile device, and wherein the help-receiving radius is centered around the distress location of the primary mobile device. The help-receiving radius is preferably determined by the primary mobile device but may also depend on the severity of the information provided and the need. The accessible mobile devices are designated as the proximal mobile devices with the remote server. This arrangement results in the determination of the devices close enough to assist in an emergency situation. Finally, the help request is relayed from the secondary mobile device, through the remote server, and to each proximal mobile device. In this way, each proximal mobile device is fully aware of the situation and the individual who is at risk or in danger.

Figure 11:
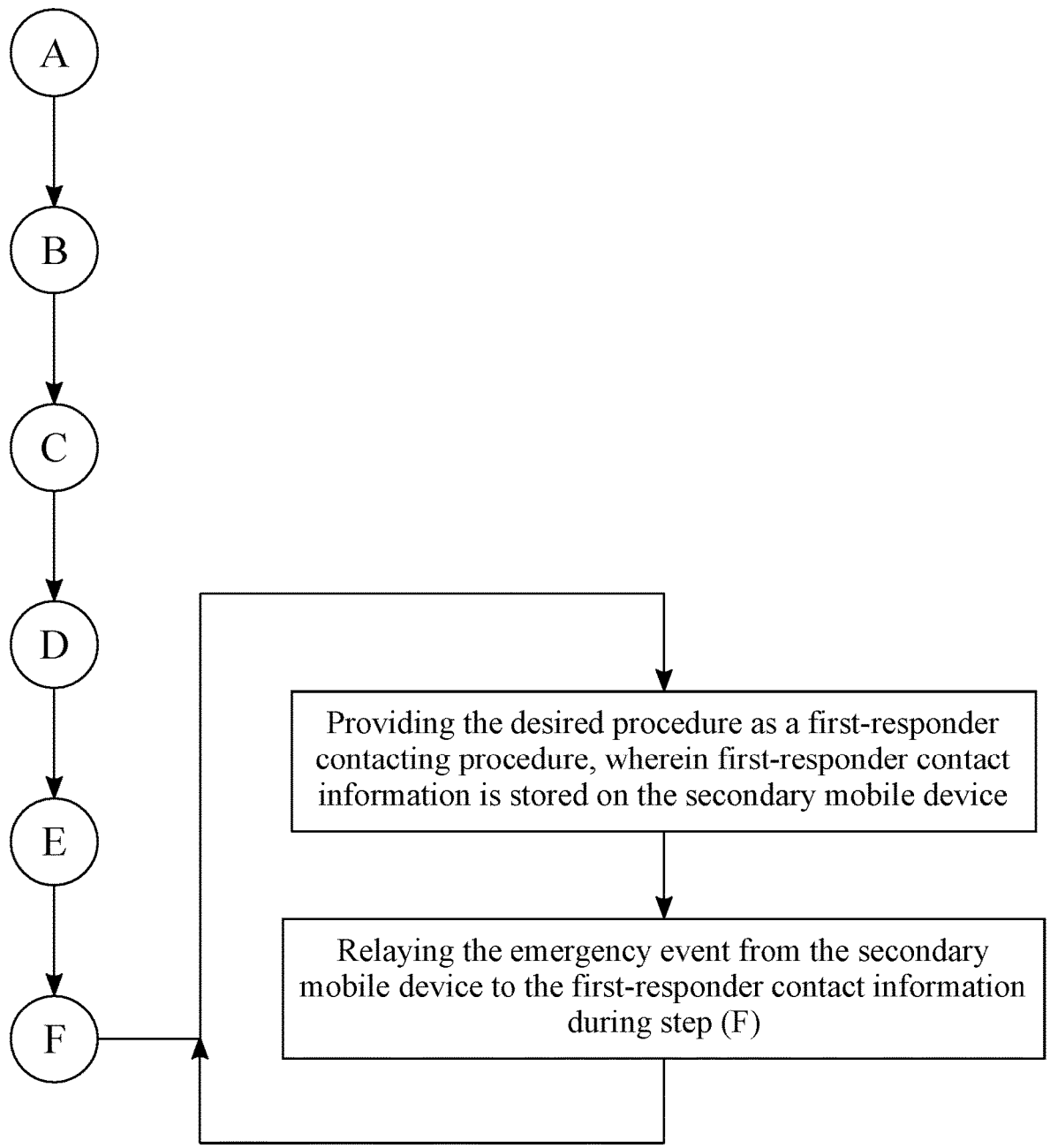
FIG. 11 is a flowchart illustrating the subprocess of contacting first responders.

In many circumstances, it may be advantageous to explicitly target emergency staff, including emergency medical technicians, firefighters, police, or more public servants. To achieve this, the desired procedure is provided as a first-responder contacting procedure, wherein first-responder contact information is stored on the secondary mobile device, as represented in FIG. 11. The first-responder contact information could relate to anybody among police, firefighters, medical staff, or more responder types. The emergency event is relayed from the secondary mobile device to the first-responder contact information during Step F. Thus, the first-responder contact information is made aware of the situation as it has been presented through the remote server by the secondary mobile device.

Figure 12:
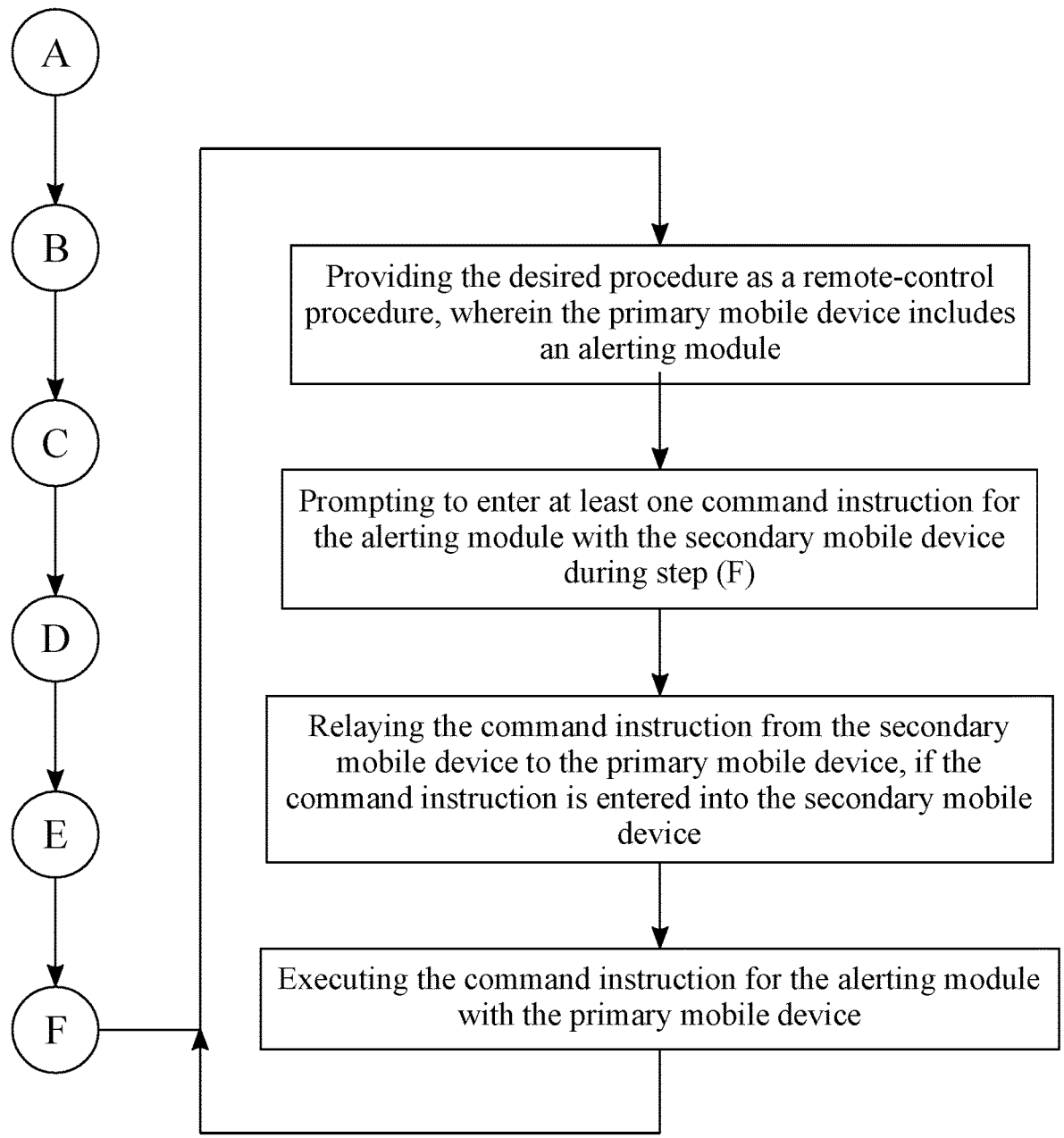
FIG. 12 is a flowchart illustrating the subprocess of a secondary mobile device assuming control over a primary mobile device.

Some incidents may be better handled through the usage of external control of the primary mobile device. To provide for such an event, the desired procedure is provided as a remote-control procedure, wherein the primary mobile device includes an alerting module, as represented in FIG. 12. The alerting module may include any or all of sirens, speakers, spotlights, light-emitting diodes, halogen bulbs, or a variety of alternative illumination and sonic devices capable of attracting attention to a specific location. At least one command instruction is prompted for the alerting module with the secondary mobile device to enter during Step F. The at least one command instruction may relate to remotely activating any part or parts of the alerting module. The command instruction is relayed from the secondary mobile device to the primary mobile device, if the command instruction is entered into the secondary mobile device. This arrangement allows the signal to travel to the primary mobile device, thus enabling control over the behavior of the primary mobile device. Then, the command instruction for the alerting module is executed with the primary mobile device. In this way, the primary mobile device responds to signals sent from the secondary mobile device. This may be advantageous for events including locating somebody lost at night, or in a large crowd.

Figure 13:
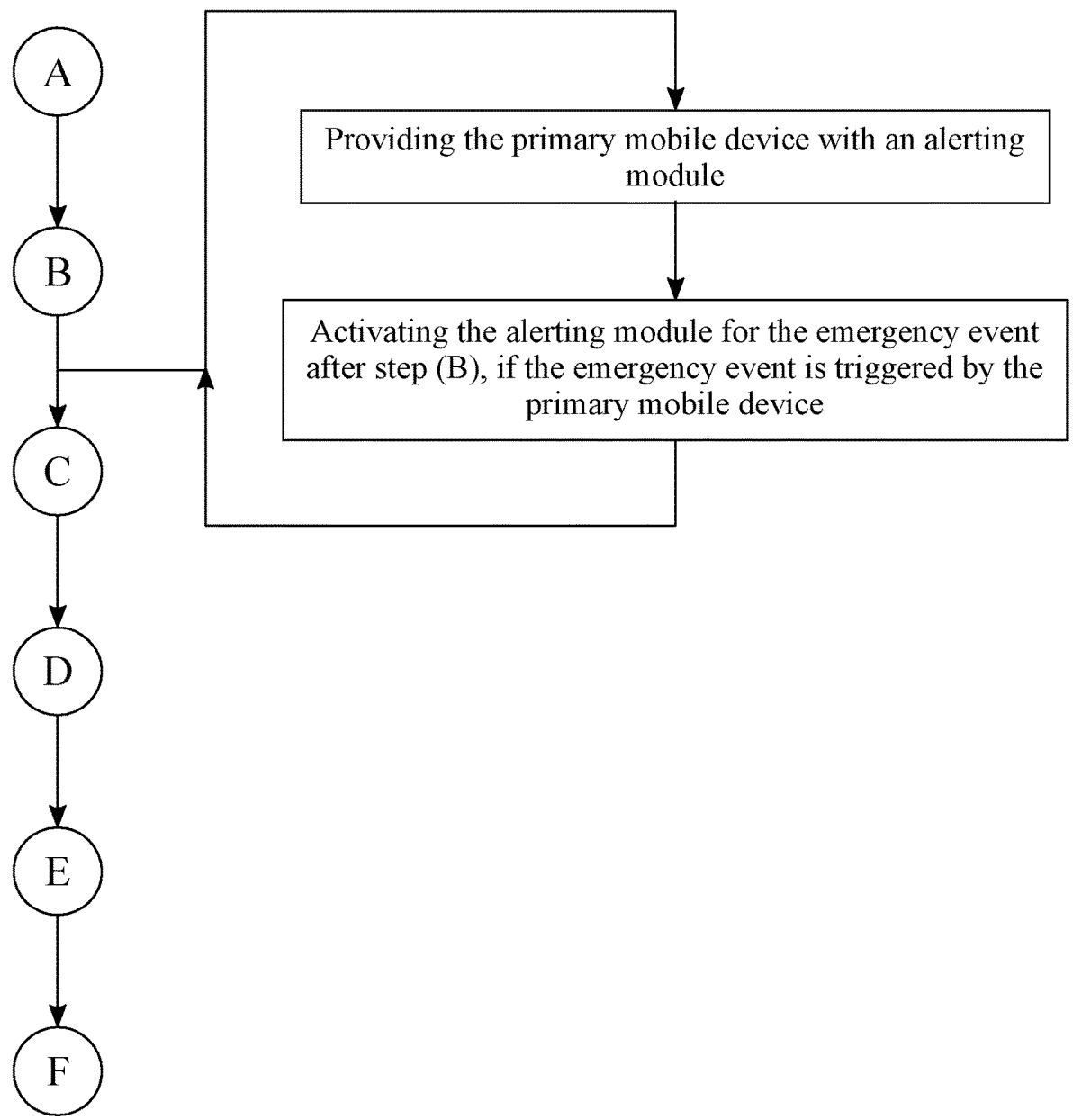
FIG. 13 is a flowchart illustrating the subprocess of activating an alert module.

The user of the primary mobile device may wish to have the capacity to control the alerting module upon deployment of an emergency event independently of the secondary mobile device. To achieve this, the primary mobile device is provided with an alerting module, as represented in FIG. 13. The alerting module contains all of the above beacon features. The alerting module is activated for the emergency event after Step B, if the emergency event is triggered by the primary mobile device. This arrangement allows the user of the primary mobile device to interact with potential assailants as necessary, or to draw attention to the user's position.

Figure 14:
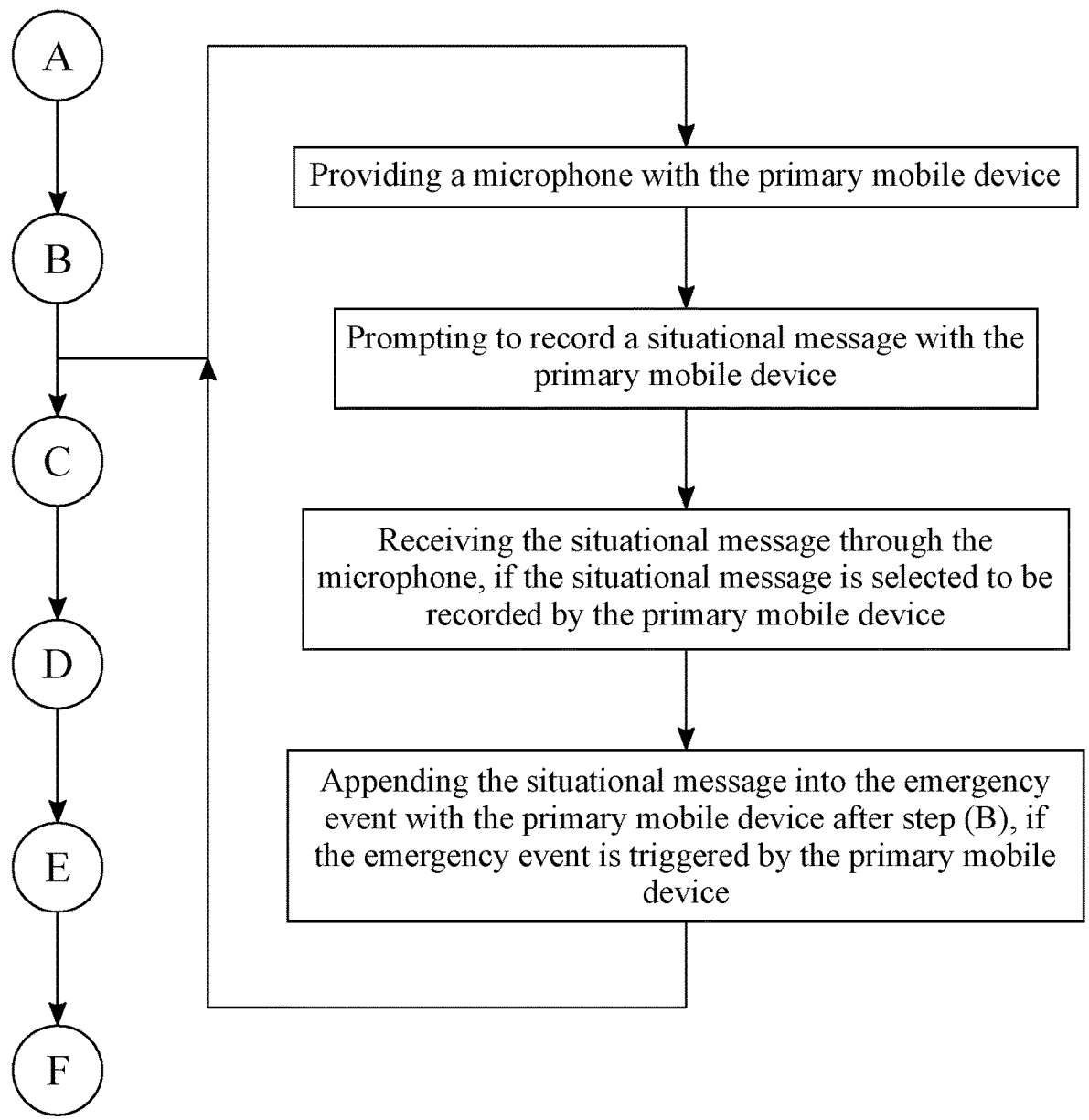
FIG. 14 is a flowchart illustrating the subprocess of appending a message into the emergency event.

In many circumstances, a user of the primary mobile device may act in anticipation of being in a dangerous situation in order to facilitate a potential rescue. To help this, a microphone is provided with the primary mobile device, as represented in FIG. 14. The microphone captures audio data for storage by the primary mobile device. The primary mobile device is prompted to record a situational message. The situational message may include details such as departure dates, arrival dates, accompanying parties, personal messages, or any other information that may be especially helpful in an emergency situation. The situational is received message through the microphone, if the situational message is selected to be recorded by the primary mobile device. Thus, the user of the primary mobile device determines whether to record a message for subsequent storage and potential transferal. Finally, the situational message is appended into the emergency event with the primary mobile device after Step B, if the emergency event is triggered by the primary mobile device. In this way, if an emergency transpires, the situational message is sent along with other relevant information within the emergency event.

Figure 15:
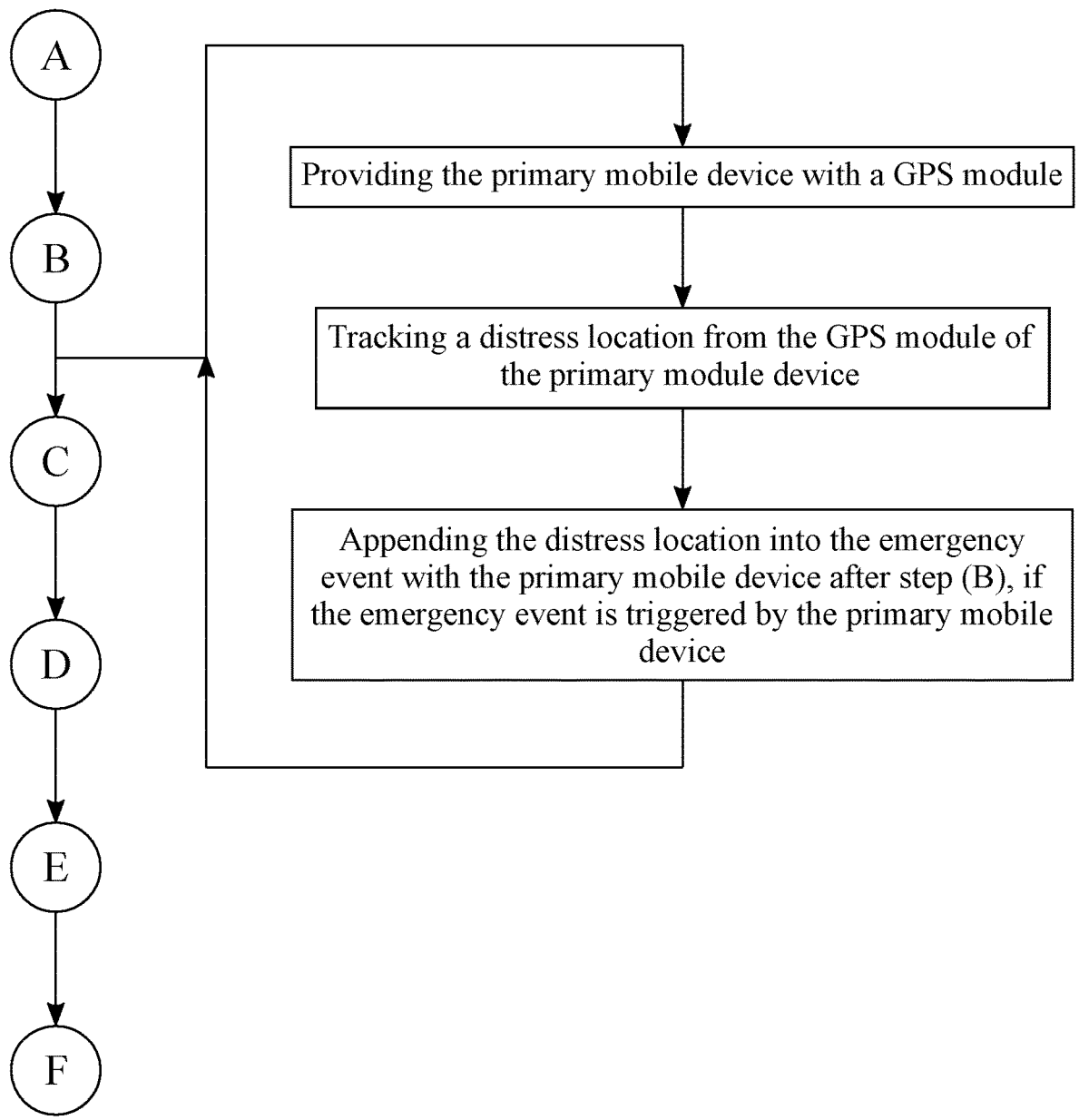
FIG. 15 is a flowchart illustrating the subprocess of tracking the location of the primary mobile device.

Other circumstances may benefit from the inclusion of direct transferal of the location of the primary mobile device. To this end, the primary mobile device is provided with a GPS module, as represented in FIG. 15. The GPS module tracks the coordinate-based geolocation of the connected primary mobile device. A distress location is tracked from the GPS module of the primary mobile device. This relationship allows the GPS module to continuously record the location of the primary mobile device, which is particularly useful in the event that a person is moving during a potentially dangerous situation. The distress location is then appended into the emergency event with the primary mobile device after Step B, if the emergency event is triggered by the primary mobile device. If the user is in an emergency, the location data collected by the GPS module is sent along with other relevant information to the secondary mobile device.

Wireless local area networks (WLANs, generally recognized under the name "Wi-Fi"), wireless ad hoc networks (radio nodes organized in a mesh topology), cellular networks (operating under the Global System for Mobile Communication standards (GSM) and others), and the global area network (GAN, supported across smaller local networks and satellite coverage areas) may also be utilized to connect the primary mobile device to the secondary mobile device. The primary mobile device ideally will be sealed against heat, cold, water, shock, and include a self-contained power supply capable of extended operation without replenishment.

Although the invention has been explained in relation to its preferred embodiment, it is to be understood that many other possible modifications and variations can be made without departing from the spirit and scope of the invention as hereinafter claimed.

What is claimed is:

1. A method of communicating an emergency event, the method comprises the steps of:
   (A) providing at least one primary mobile device, wherein the primary mobile device is communicably coupled to at least one secondary mobile device, and wherein a plurality of emergency procedures is stored on the secondary mobile device, wherein the primary mobile device comprises a visually distinguishable button, a microphone and an inertial measurement unit (IMU), wherein the visually distinguishable button is a virtual button displayed on a screen of the primary mobile device, wherein an audible passcode and a normal motion threshold are stored on the primary mobile device;
   (B) prompting to trigger an emergency event with the primary mobile device by the visually distinguishable button being actuated through the primary mobile device, or by unverified audible data being received through the microphone and matching the audible passcode, or by a plurality of motion data entries being received through the IMU and at least one entry from the plurality of motion data entries being outside of the normal motion threshold;
   (C) relaying the emergency event from the primary mobile device to the secondary mobile device, if the emergency event is triggered by the primary mobile device;
   (D) outputting the emergency event on the secondary mobile device;
   (E) prompting to select at least one desired procedure from the plurality of emergency procedures with the secondary mobile device; and
   (F) executing the desired procedure with the secondary mobile device.

2. The method of communicating an emergency event, the method as claimed in claim 1, wherein the primary mobile device is provided with a wearable strap.

3. The method of communicating an emergency event, the method as claimed in claim 1, wherein the secondary mobile device is provided with a wearable strap.

4. The method of communicating an emergency event, the method as claimed in claim 1 comprises the steps of:
   providing at least one remote server, wherein the primary mobile device and the at least one secondary mobile device are communicably coupled to the remote server; and
   relaying the emergency event from the primary mobile device, through the remote server, and to the secondary mobile device during step (C).

5. The method of communicating an emergency event, the method as claimed in claim 1 comprises the steps of:
   providing a near field communication (NFC) network, wherein the primary mobile device and the secondary mobile device are communicably coupled to each other by the NFC network; and
   relaying the emergency event from the primary mobile device, through the NFC network, and to the secondary mobile device during step (C).

6. The method of communicating an emergency event, the method as claimed in claim 1 comprises the steps of:

providing the desired procedure as a proximal group awareness procedure, wherein a plurality of proximal mobile devices is positioned within a help-receiving radius of the primary mobile device;

generating a help request from the emergency event with the secondary mobile device;

relaying the help request from the secondary mobile device to each proximal mobile device; and displaying the help request through each proximal mobile device.

7. The method of communicating an emergency event, the method as claimed in claim 6 comprises the steps of:

providing a plurality of arbitrary mobile devices, wherein the primary mobile device, the secondary mobile device, and each arbitrary mobile device are communicably coupled to the remote server, and wherein the primary mobile device, the secondary mobile device, and each arbitrary mobile device each include a global positioning system (GPS) module;

tracking a distress location from the GPS module of the primary mobile device;

tracking a current location from the GPS module of each arbitrary mobile device;

sending the distress location of the primary mobile device and the current location of each arbitrary mobile device to the remote server;

comparing the distress location of the primary mobile device to the current location of each arbitrary mobile device with the remote server in order to identify a plurality of accessible mobile devices from the plurality of arbitrary mobile devices, wherein the current location of each accessible mobile device is within the help-receiving radius of the primary mobile device, and wherein the help-receiving radius is centered around the distress location of the primary mobile device;

designating the accessible mobile devices as the proximal mobile devices with the remote server; and relaying the help request from the secondary mobile device, through the remote server, and to each proximal mobile device.

8. The method of communicating an emergency event, the method as claimed in claim 1 comprises the steps of:

providing the desired procedure as a first-responder contacting procedure, wherein first-responder contact information is stored on the secondary mobile device; and relaying the emergency event from the secondary mobile device to the first-responder contact information during step (F).

9. The method of communicating an emergency event, the method as claimed in claim 1 comprises the steps of:

providing the desired procedure as a remote-control procedure, wherein the primary mobile device includes an alerting module;

prompting to enter at least one command instruction for the alerting module with the secondary mobile device during step (F);

relaying the command instruction from the secondary mobile device to the primary mobile device, if the command instruction is entered into the secondary mobile device; and executing the command instruction for the alerting module with the primary mobile device.

10. The method of communicating an emergency event, the method as claimed in claim 1 comprises the steps of:

providing the primary mobile device with an alerting module; and activating the alerting module for the emergency event after step (B), if the emergency event is triggered by the primary mobile device.

11. The method of communicating an emergency event, the method as claimed in claim 1 comprises the steps of:

prompting to record a situational message with the primary mobile device;

receiving the situational message through the microphone, if the situational message is selected to be recorded by the primary mobile device; and appending the situational message into the emergency event with the primary mobile device after step (B), if the emergency event is triggered by the primary mobile device.

12. The method of communicating an emergency event, the method as claimed in claim 1 comprises the steps of:

providing the primary mobile device with a GPS module;

tracking a distress location from the GPS module of the primary mobile device; and appending the distress location into the emergency event with the primary mobile device after step (B), if the emergency event is triggered by the primary mobile device.

* * * * *